(12) United States Patent
Colonna (10) Patent No.: US 10,887,728 B2
(45) Date of Patent: Jan. 5, 2021

(54) METHOD AND SYSTEM FOR DETERMINING THE MOBILITY STATUS OF A USER OF A WIRELESS COMMUNICATION NETWORK (71) Applicant: TELECOM ITALIA S.p.A., Milan (IT)

(72) Inventor: Massimo Colonna, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/462,989

(22) PCT Filed: Dec. 27, 2016

(86) PCT No.: PCT/EP2016/082711
§ 371 (c)(1),
(2) Date: May 22, 2019

(87) PCT Pub. No.: WO2018/121842
PCT Pub. Date: Jul. 5, 2018

(65) Prior Publication Data
US 2019/0313214 A1 Oct. 10, 2019

(51) Int. Cl.
*H04W 24/00* (2009.01)
*H04W 64/00* (2009.01)
(Continued)

(52) U.S. Cl.
CPC ........... *H04W 4/029* (2018.02); *H04W 4/022* (2013.01); *H04W 4/023* (2013.01); *H04W 64/006* (2013.01)

(58) Field of Classification Search
CPC ....................................................... H04W 4/02
(Continued)

(56) References Cited

U.S. PATENT DOCUMENTS

| | | | |
|---|---|---|---|
| 6,516,190 B1* | 2/2003 | Linkola | H04M 15/00 455/408 |
| 2006/0160540 A1* | 7/2006 | Strutt | G01S 11/06 455/440 |

(Continued)

OTHER PUBLICATIONS

International Search Report dated Jul. 13, 2017 in PCT/EP2016/082711 filed on Dec. 27, 2016.
(Continued)

*Primary Examiner* — German Viana Di Prisco
*Assistant Examiner* — Mark G. Pannell
(74) *Attorney, Agent, or Firm* — Oblon, McClelland, Maier & Neustadt, L.L.P.

(57) ABSTRACT

A method for determining the mobility status of a user of a wireless communication network includes retrieving, from the wireless communication network, an indication about interactions between a user equipment associated with that user and the wireless communication network, and, for each interaction, determining a served area of the wireless communication network pertaining to that user equipment at the occurrence of that interaction, and determining the mobility status of that user at the occurrence of that interaction according to a comparison between a distance between the served area and a first further served area of the wireless communication network pertaining to that user equipment, and a first threshold distance; or a comparison between a distance between the served area and a second further served area of the wireless communication network pertaining to that user equipment, and a second threshold distance.

11 Claims, 6 Drawing Sheets

(51) Int. Cl.
*H04W 4/029* (2018.01)
*H04W 4/02* (2018.01)
*H04W 4/021* (2018.01)

(58) Field of Classification Search
USPC .................................................... 455/456.1
See application file for complete search history.

(56) References Cited

U.S. PATENT DOCUMENTS

| | | | |
|---|---|---|---|
| 2007/0160009 A1* | 7/2007 | Joshi .................... | H04W 40/14 370/331 |
| 2010/0261473 A1* | 10/2010 | Al-Bakri ................ | H04W 8/02 455/435.2 |
| 2011/0019582 A1* | 1/2011 | Okmyanskiy ....... | H04L 41/0893 370/254 |
| 2013/0053065 A1 | 2/2013 | Xiao et al. | |
| 2014/0045498 A1 | 2/2014 | Choi et al. | |
| 2014/0206357 A1* | 7/2014 | Lu ........................ | H04W 36/16 455/436 |
| 2016/0044557 A1 | 2/2016 | Choi et al. | |
| 2016/0100362 A1* | 4/2016 | Palanisamy ....... | H04W 52/0212 370/311 |
| 2016/0174185 A1* | 6/2016 | Ramakrishnan .... | H04W 64/006 455/456.1 |
| 2016/0338002 A1* | 11/2016 | Yiu ....................... | H04W 24/08 |
| 2018/0184254 A1* | 6/2018 | Varga .................... | H04L 67/18 |

OTHER PUBLICATIONS

Written Opinion of the International Searching Authority dated Jul. 13, 2017 in PCT/EP2016/082711 filed on Dec. 27, 2016.

* cited by examiner

METHOD AND SYSTEM FOR DETERMINING THE MOBILITY STATUS OF A USER OF A WIRELESS COMMUNICATION NETWORK

BACKGROUND OF THE INVENTION

Field of the Invention

The present invention generally relates to a method and system for determining the mobility status of a user of a wireless communications network (for example, a cellular network, a WLAN network or a Bluetooth network).

Overview of the Related Art

In today's world, wireless mobile communications devices (such as user equipment or terminals including, for example, mobile phones) are creating new dimensions of interconnectedness between people, places, and urban infrastructure, so much that they can be effectively used for monitoring user's behavior.

An effective method for determining the presence and movements of users can be based on the use of information of their user equipment in the mobile communication network and known by mobile operators both for administrative purposes (e.g., pricing of services) and for technical purposes (e.g., call management, user mobility management, etc.). This information, such as the information provided in the "Call Detail Record" and/or in the "Visitor Location Register", comprises position-time pairs associated with each user equipment when coming into contact with the wireless communication network during its operation (e.g., power on/off, call sending/reception, SMS sending/reception, data transmission, etc.).

In the state of the art, solutions are known for monitoring urban areas, especially in the presence of special events or places of special interest, based on telephone traffic. Examples of works disclosing such solutions are listed and briefly discussed here below.

Francesco Calabrese, Carlo Ratti, "*Real Time Rome*", Networks and Communications Studies 20(3-4), 247-258, 2006, discloses a urban-wide real-time monitoring system that collects and processes data provided by telecommunications networks and transportation systems in order to understand patterns of daily life in Rome.

F. Manfredini, P. Pucci, P. Secchi, P. Tagliolato, S. Vantini, V. Vitelli, "*Treelet decomposition of mobile phone data for deriving city usage and mobility pattern in the Milan urban region*", MOXReport No. 25/2012, MOX, Dipartimento di Matematica "F. Brioschi", Politecnico di Milano) discloses a geo-statistical unsupervised learning technique aimed at identifying useful information on hidden patterns of mobile phone use. These hidden patterns regard different usages of the city in time and in space which are related to individual mobility, outlining the potential of this technology for the urban planning community. The methodology allows to obtain a reference basis that reports the specific effect of some activities on the Erlang data recorded and a set of maps showing the contribution of each activity to the local Erlang signal. Some results are selected as significant for explaining specific mobility and city usages patterns (commuting, nightly activities, distribution of residences, non-systematic mobility) and their significance and their interpretation are tested from an urban analysis and planning perspective at the Milan urban region scale.

Ramon Caceres, James Rowland, Christopher Small, and Simon Urbanek, "*Exploring the Use of Urban Greenspace through Cellular Network Activity*", 2nd Workshop on Pervasive Urban Applications (PURBA), June 2012, discloses the use of anonymous records of cellular network activity to study the spatiotemporal patterns of human density in an urban area. This paper presents the vision and some early results of this effort. Firstly, a dataset of six months of activity in the New York metropolitan area is described. Secondly, a technique for estimating network coverage areas is presented. Thirdly, the used approach in analyzing changes in activity volumes within those areas is described. Finally, preliminary results regarding changes in human density around Central Park are presented.

The major limitation of the solutions disclosed in the above works, as well as those disclosed in other similar works, is to allow only "relative" analysis, i.e. the analysis of the amount of telephone traffic in a first place compared to the amount of telephone traffic in a second place, at a same time. Therefore, the above solutions are silent about the behavior of individual users—indeed, a higher telephone traffic in the first place rather than in the second place does not necessarily mean more users present in the first place with respect to the second place.

In urban planning and management activities (such as transport systems and traffic analysis) as well as in event monitoring and management activities (such as estimation of the number of people in a crowd and real-time calculation of origin-destination matrix, for example relating to participants at a public event), it is important to determine the mobility status of the user at a sequence of positions taken by him/her, i.e. to distinguish, in the sequence of positions taken by the user, the positions in which the user is in motion (motion status of the user) from the positions in which the user is not in motion (stay status of the user).

In the state of the art, solutions are known for determining the mobility status of the user in the wireless communication network. Examples of such solutions are listed and briefly discussed herebelow.

Yasuo Asakura, Eiji Hato, "*Tracking survey for individual travel behaviour using mobile communication instruments*", Transportation Research Part C 12 (2004) 273-291), discloses methodologies of using mobile communication instruments for tracking survey for individual travel behavior in urban space. In particular, the characteristics of the tracking method using cellular phone are discussed. In addition to tracking type data collection procedure, the data transfer and labelling algorithms are proposed for providing various trip attributes to each point included in the location positioning data.

Jameson L. Toole, Serdar Colak, Bradley Sturt, Lauren P. Alexander, Alexandre Evsukoff, Marta C. González, "*The path most traveled: Travel demand estimation using big data resources*" Transportation Research Part C: Emerging Technologies, Volume 58, Part B, September 2015, Pages 162-177, discloses a system for estimating multiple aspects of travel demand using call detail records (CDRs) from mobile phones in conjunction with open and crowd-sourced geospatial data, census records, and surveys. Numerous existing and new algorithms brought together to generate representative origindestination matrices, route trips through road networks constructed using open and crowd-sourced data repositories, and perform analytics on the system's output. An online, interactive visualization platform is also presented to communicate these results to researchers, policy makers, and the public.

Lauren Alexander, Shan Jiang, Mikel Murga, Marta C. González, "*Origin-destination trips by purpose and time of day inferred from mobile phone data*", Transportation Research Part C: Emerging Technologies, Volume 58, Part B, September 2015, Pages 240-250, discloses methods to estimate average daily origin-destination trips from triangulated mobile phone records of millions of anonymized users. These records are first converted into clustered locations at which users engage in activities for an observed duration. These locations are inferred to be home, work, or other depending on observation frequency, day of week, and time of day, and represent a user's origins and destinations. Since the arrival time and duration at these locations reflect the observed (based on phone usage) rather than true arrival time and duration of a user, the departure time is probabilistically inferred using survey data on trips in major US cities. Trips are then constructed for each user between two consecutive observations in a day. These trips are multiplied by expansion factors based on the population of a user's home Census Tract and divided by the number of days on which we observed the user, distilling average daily trips. Aggregating individuals' daily trips by Census Tract pair, hour of the day, and trip purpose results in trip matrices that form the basis for much of the analysis and modeling that inform transportation planning and investments.

Shan Jiang, Gaston A. Fiore, Yingxiang Yang, Joseph Ferreira, Jr., Emilio Frazzoli, Marta C. González, "*A Review of Urban Computing for Mobile Phone Traces: Current Methods, Challenges and Opportunities*", Proceedings of the 2nd ACM SIGKDD International Workshop on Urban Computing. ACM, 2013, discloses three classes of methods to extract information from triangulated mobile phone signals, and describes applications with different goals in spatiotemporal analysis and urban modeling. Firstly, a method is disclosed that bridges triangulated mobile phone data with previously established findings obtained from data at more coarse-grained resolutions (such as at the cell tower or census tract levels), this method allowing to relate daily mobility networks, called motifs, with trip chains extracted from travel diary surveys. Secondly, a method is disclosed that takes advantage of the high spatial resolution of the triangulated phone data to infer trip purposes by examining semantic-enriched land uses surrounding destinations in individual's motifs. Thirdly, a portable computational architecture is disclosed that allows managing and analyzing mobile phone data in geospatial databases, and mapping mobile phone trips onto spatial networks such that further analysis about flows and network performances can be done.

Calabrese Francesco, Giusy Di Lorenzo, Liang Liu, and Carlo Ratti, "*Estimating Origin-Destination Flows Using Mobile Phone Location Data*", IEEE Pervasive Computing 10, no. 4 (April 2011): 36-44, discloses an algorithm to analyze opportunistically collected mobile phone location data, so as to estimate weekday and weekend travel patterns of a large metropolitan area with high accuracy.

Renso C., Baglioni M., de Macedo Jose Antonio F, Trasarti R., Wachowicz, M., "*How you move reveals who you are: understanding human behavior by analyzing trajectory data*", Knowledge and Information Systems, November 2013; 37(2). DOI: 10.1007/s10115-012-0511-z, discloses the definitions of the basic concepts about mobility data, an analysis of the issues in mobility data management, and a survey of the approaches and techniques for: (i) constructing trajectories from movement tracks, (ii) enriching trajectories with semantic information to enable the desired interpretations of movements, and (iii) using data mining to analyze semantic trajectories and extract knowledge about their characteristics, in particular the behavioral patterns of the moving objects.

SUMMARY OF INVENTION

The Applicant has recognized that none of the currently available solutions is satisfactory.

Indeed, the above solutions for determining the mobility status of a user of the wireless communication network are all based on the common approach of comparing user positions with a predetermined or fixed threshold, and more particularly of comparing the distance between the user positions (generally the current position and the previous position) with a predetermined or fixed threshold distance.

The Applicant has noticed that this approach is inadequate for wireless communication networks (especially for cellular networks) having very wide coverage areas, including for example both urban areas and rural areas. In such areas, in fact, the distance between the served areas (corresponding to the cells when the wireless communication network is a cellular network) is very different (typically of the order of hundreds of meters in urban areas, for example 300-500 meters, and of the order of kilometers in rural areas, for example 5-10 km).

As user positions are based on the positions of the served areas in which the user performs his/her telephone activity, the distances between the user positions correspond to the distances between the served areas. Consequently, if a low threshold distance is set (e.g., of the order of the hundreds of meters), the comparison with the threshold distance provides a correct result in urban areas, but not in rural areas (since the distances between the user positions will always be higher than the threshold distance), so that in all user positions the user will result in the motion status. Conversely, if a high threshold distance is set (e.g., of the order of several kilometers), the comparison with the threshold distance provides a correct result in rural areas, but not in urban areas (since the distances between the user positions will always be lower than the predetermined threshold distance), so that in all user positions the user will result in the stay status.

In view of the above, the Applicant has faced the above mentioned issues, and has devised a method and system for determining the mobility status of a user of a wireless communications network based on a variable threshold distance depending on (e.g., one or features of) the served areas of the wireless communications network that identify the user positions.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present invention that applies mutatis mutandis to any other aspect).

More specifically, an aspect of the present invention relates to a method for determining the mobility status of a user of a wireless communication network, the mobility status taking a motion status wherein the user is in motion or a stay status wherein the user is not in motion. The method comprises:

retrieving, from the wireless communication network, an indication about interactions between a user equipment associated with that user and the wireless communication network, and, for each interaction, determining a served area of the wireless communication network pertaining to that user equipment at the occurrence of that interaction, and determining the mobility status of that user at the occurrence of that interaction according to at least one among:
- a comparison between a distance between the served area and a first further served area of the wireless communication network pertaining to that user equipment at the occurrence of a first further interaction occurring before said interaction, and a first threshold distance depending on the served area and on the first further served area;
- a comparison between a distance between the served area and a second further served area of the wireless communication network pertaining to that user equipment at the occurrence of a second further interaction occurring after said interaction, and a second threshold distance depending on the served area and on the second further served area.

According to an embodiment, the first threshold distance depends on a radius of the served area and on a radius of the first further served area. Preferably, the second threshold distance depends on the radius of the served area and on a radius of the second further served area.

According to an embodiment, said determining the mobility status of that user at the occurrence of that interaction comprises:
- determining that the user is in the stay status if the distance between the served area and the first further served area is lower than the first threshold distance; or
- determining that the user is in the stay status if the distance between the served area and the first further served area is higher than the first threshold distance and the distance between the served area and the second further served area is lower than the second threshold distance, or
- determining that the user is in the motion status if the distance between the served area and the first further served area is higher than the first threshold distance and the distance between the served area and the second further served area is higher than the second threshold distance.

According to an embodiment, said determining the mobility status of that user at the occurrence of that interaction comprises, if no first further interaction is provided with respect to said interaction,
- determining that the user is in the stay status if the distance between the served area and the second further served area is lower than the second threshold distance, and
- setting the mobility status of the user at the motion status otherwise.

According to an embodiment, said determining the mobility status of that user at the occurrence of that interaction comprises, if no second further interaction is provided with respect to said interaction:
- determining that the user is in the stay status if the distance between the served area and the first further served area is lower than the first threshold distance, and
- setting the mobility status of the user at the motion status otherwise.

According to an embodiment, the distance between the served area and the first further served area is based on the distance between a center of the served area and a center of the first further served area. Preferably, the distance between the served area and the second further served area is based on the distance between the center of the served area and a center of the second further served area.

According to an embodiment, said first threshold distance depends on a combination between the radius of the served area and the radius of the first further served area. Preferably, said second threshold distance depends on a combination between the radius of the served area and on the radius of the second further served area.

According to an embodiment, said combination is a linear combination.

According to an embodiment, the first further served area comprises at least two served areas associated with consecutive interactions for which the stay status of the user has been determined. Preferably, the center of the first further served area is determined as centroid of the centers of said at least two served areas. Additionally or alternatively, the radius of the first further served area is determined as average radius of said at least two cells.

According to an embodiment, the mobile communication network is a GSM network. Preferably, said indication about interactions comprises at least one between "Charging Data Records" data and "Visitor Location Records" data from the GSM network.

According to an embodiment, the mobile communication network is a LTE network. Preferably, said indication about interactions comprises "Mobility Management Entity" data from the LTE network.

BRIEF DESCRIPTION OF THE ANNEXED DRAWINGS

These and other features and advantages of the present invention will be made apparent by the following description of some exemplary and non-limitative embodiments thereof; for its better intelligibility, the following description should be read making reference to the attached drawings, wherein.

DETAILED DESCRIPTION OF PREFERRED EMBODIMENTS OF THE INVENTION

Figure 1:
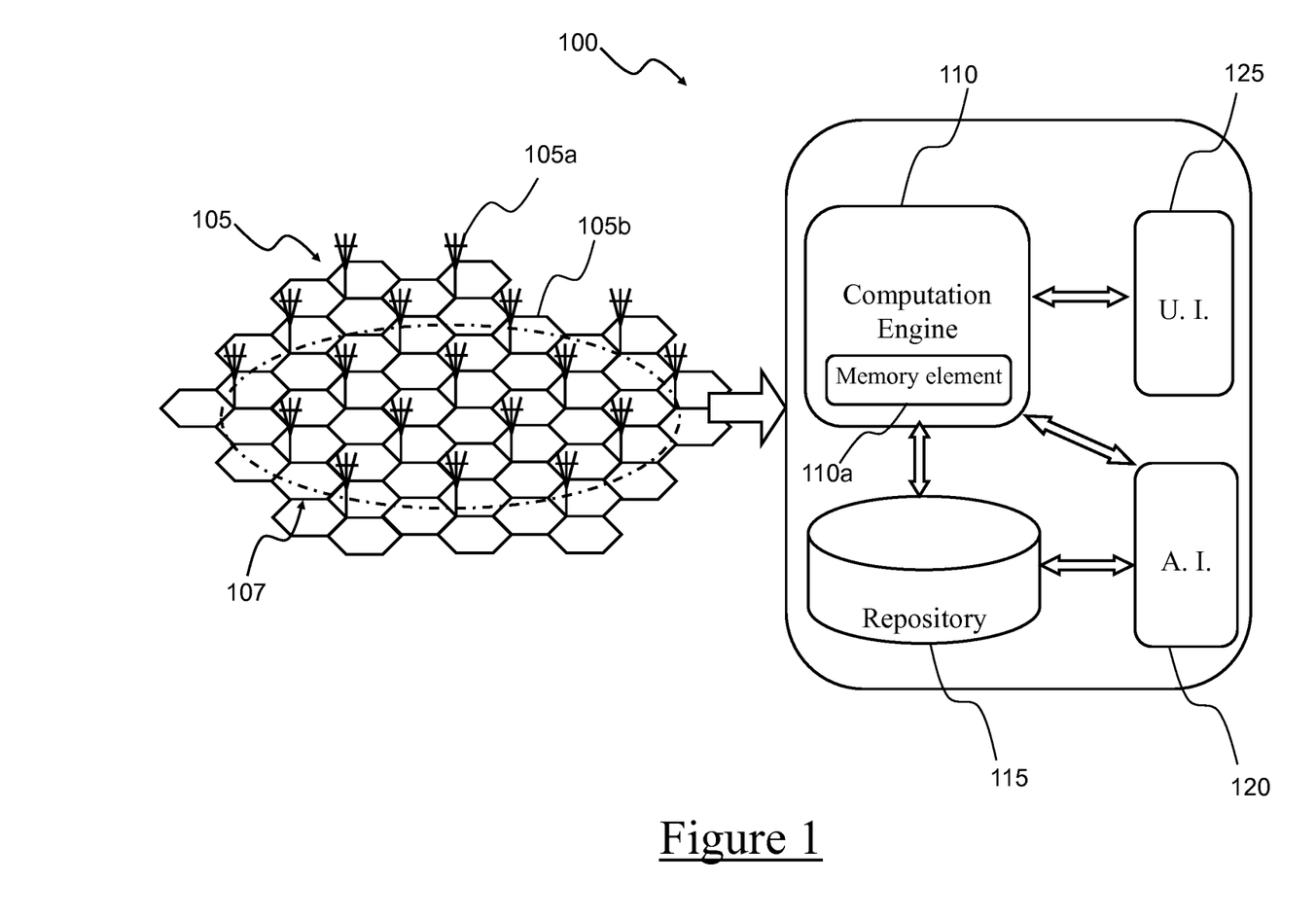
FIG. 1 schematically shows a system for determining the mobility status of a user.

With reference to the drawings, FIG. 1 schematically shows a system 100 for determining the mobility status of a user of a wireless communication network 105, the mobility status comprising for example a stay status (wherein the user is not in motion) or a motion status (e.g., wherein the user is in motion).

According to the preferred embodiment of the present invention herein considered, the wireless communication network 105 is a (e.g. 2G, 3G, 4G or higher generation) cellular network to which reference will be made from now on by way of example only. In any case, as will be apparent from the following discussion, the wireless communication network may also be a "Wireless Local Area Network" (WLAN) network or a Bluetooth network.

The system 100 is preferably coupled with the cellular network 105 for receiving positioning data of User Equipment (in the following, UE). The UE, not shown in the figure, may for example comprise terminals (such as mobile phones, smartphones, tablets with 2G-3G-4G connectivity) of (i.e., belonging to or associated with) users located in a surveyed geographic area 107 of the wireless communication network 105. The surveyed geographic area 107 is schematized in FIG. 1 as the area within the dash-and-dot line, and may for example comprise a region, a city, a municipality, or a district.

The cellular network 105 preferably comprises a plurality of (i.e., two or more) communication stations 105a (e.g., radio base stations of the mobile telephony network) geographically distributed in the surveyed area 107. Each communication station 105a is adapted to manage communications of UE in one or more served areas 105b (in the example at issue, three areas are served by each communication station 105a). In the preferred embodiment herein considered wherein the wireless communication network is a cellular network, the served areas 105b correspond to the cells of the cellular network to which reference will be made from now on by way of example only.

Even more generally, each communication station 105a of the mobile communication network 105 is adapted to interact with any UE located within one of the cells 105b served by such communication station 105a (e.g., interactions at power on/off, at location area update, at incoming/outgoing calls, at sending/receiving SMS and/or MMS, and/or at Internet access). In the following, such interactions between the UE and the mobile communication network 105 will be generally denoted as events.

It should be apparent that the surveyed geographic area 107 may be regarded as subdivided in a plurality of sectors, each corresponding to a respective cell 105b of the (part of the) mobile telephony network 105 superimposed on the surveyed area 107.

The system 100 comprises a computation engine 110 configured to process data retrieved from the mobile communication network 105, and a repository 115 (such as a database, a file system, etc.) configured to store data regarding interactions between the UE and the mobile communication network 105 (i.e., the events), computation results generated by the computation engine 110 and, possibly, other processing data generated by and/or provided to the system 100 (generally in a binary format). The system 100 preferably comprises an administrator interface 120 (e.g., a computer) configured to modify parameters and/or algorithms used by the computation engine 110 and/or accessing data stored in the repository 115.

Preferably, the system 100 comprises one or more user interfaces 125 (e.g., a user terminal, a software running on a remote terminal connected to the system 100) configured to receive inputs from, and to provide output to, a user of the system 100. The term "user of the system" as used in the present disclosure may refer to one or more human beings, and/or to external computing systems (such as a computer network, not shown) of a third party, being subscriber of the services provided by the system 100 and enabled to access the system 100 e.g., under subscription of a contract with a service provider owner of the system 100, and typically with reduced right of access to the system 100 compared to the right of access held by an administrator of the system 100 operating through the administrator interface 120.

It should be appreciated that the system 100 may be implemented in any known manner; for example, the system 100 may comprise a single computer, or a network of distributed computers, either of physical type (e.g., with one or more main machines implementing the computation engine 110 and the repository 115, connected to other machines implementing administrator and user interfaces 120 and 125) or of virtual type (e.g., by implementing one or more virtual machines in a computer network).

The system 100 is preferably configured to retrieve (and/or receive) an event record for each event occurred between a UE and the mobile communication network 105 (through one of its communication stations 105a) within the surveyed geographic area 107. Preferably, each event record retrieved by the system 100 from the mobile communication network 105 comprises:

a UE identifier of the UE that is involved in the corresponding event $e_i$. The UE identifier may for example comprise one or more among the "International Mobile Equipment Identity" (IMEI), the "International Mobile Subscriber Identity" (IMSI) and/or the "Mobile Subscriber ISDN Number" (MSISDN) code. According to an embodiment of the present invention, the UE identifier is provided as encrypted information in order to ensure the privacy of the UE owner. Anyway, if the need arises, the encrypted information (i.e., the identity of the owner of the UE corresponding to the UE identifier) may be decrypted by implementing a suitable decryption algorithm, such as for example the algorithm SHA256 described in "Secure Hash Standard (SHS)", National Institute of Standards and Technology FIPS—180-4, Mar. 6, 2012;

time data (also denoted as timestamp) indicating the time at which the corresponding event has occurred;

UE geographical position data, e.g. based on the cell 105b in which the UE is located at the time of occurrence of the corresponding event.

In the following discussion of an exemplary procedure carried out by the system 100, only the UE identifier and the UE geographical position data are used—in any case, nothing prevents from modifying the procedure in such a way to use the timestamps in addition or in alternative to UE identifier and the UE geographical position data.

The system 100 may retrieve (and/or receive) event records related to a generic UE from the mobile communication network 105 by acquiring records of data generated and used in the mobile communication network 105. For example, in case the mobile communication network 105 is a GSM or a UMTS network, "Charging Data Records" (CDR), also known as call data records, and/or "Visitor Location Records" (VLR) may be retrieved from the mobile communication network 105 and reused as event records. The CDR is a data record (usually used for billing purposes by a mobile telephony service provider operating through the mobile communication network 105) that contains attributes specific to a single instance of a phone call or other communication transaction performed between a UE and the mobile communication network 105. The VLR are databases listing UE that have roamed into the jurisdiction of a "Mobile Switching Center" (MSC), not shown, of the mobile communication network 105, which is a management element of the mobile communication network 105 managing events over a plurality of communication stations 105a. Each communication station 105a in the mobile communication network 105 is usually associated with a respective VLR.

Conversely, if the mobile communication network 105 is a LTE network, records of data associated with the event records of a generic UE are generated by a "Mobility Management Entity" (MME) within the mobile communication network 105, which is responsible for a UE tracking and paging procedure in LTE networks (where no VLR is implemented).

In operation, event records may be continuously retrieved by the system 100 from the mobile communication network 105; in order to achieve this, event records may for example be transferred from the mobile communication network 105 to the system 100 as soon as they are generated, e.g. in a sort of "push" modality.

Alternatively, event records may periodically retrieved by the system 100; in order to achieve this, event records may for example be automatically (i.e., autonomously) transferred from the mobile communication network 105 to the system 100 periodically (for example, every certain number of hours, on a daily or weekly basis) or upon request by the system 100.

The event records retrieved from the mobile communication network 105 are preferably stored in the repository 115, where they are made available to the computation engine 110 for processing. Preferably, event records generated by a same UE are grouped together in the repository 115, i.e. event records are grouped into a same event record group $erg_n$ (e.g., n=0, . . . , N) if they comprise a common UE identifier (the number of event record groups $erg_n$ depending on the number of UE whose mobility status has to be determined, and the number N of event records of each event record group $erg_n$ depending on the number of activities performed by the UE associated with that event record group $erg_n$).

According to an embodiment of the present invention, the computation engine 110 runs a procedure (described in the following) for determining the mobility status of each user. This procedure is preferably implemented by a software program product stored in a memory element 110a of the system 100. In the exemplary embodiment illustrated in FIG. 1, the memory element 110a is located within the computation engine 110—in any case, nothing prevents from locating the memory element 110a within the repository 115 (and/or elsewhere within the system 100).

Even more preferably, the event records are processed according to (as discussed in detail below) instructions provided by the system administrator (e.g., through the administrator interface 120), for example stored in the repository 115, and, possibly, according to instructions provided by a user (e.g., through the user interface 125).

Finally, the computation engine 110 provides the results of the processing performed on the event records to the user through the user interface 125, and optionally stores such processing results in the repository 115.

Figure 2A:
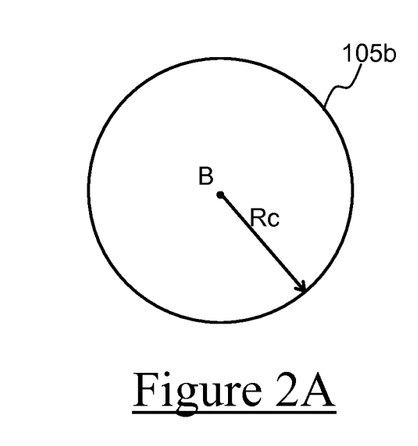
FIGS. 2A 2E show exemplary shapes in which cells of a cellular network coupled with said system may be modeled according to an embodiment of the present invention.
Figure 2B:
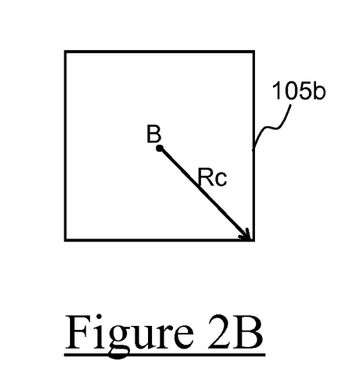
Figure 2C:
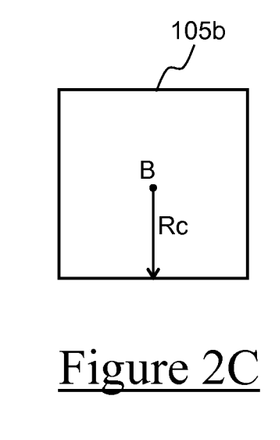
Figure 2D:
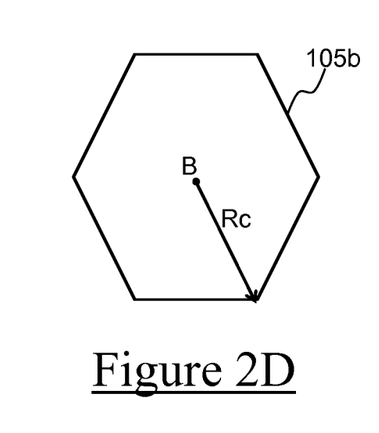
Figure 2E:
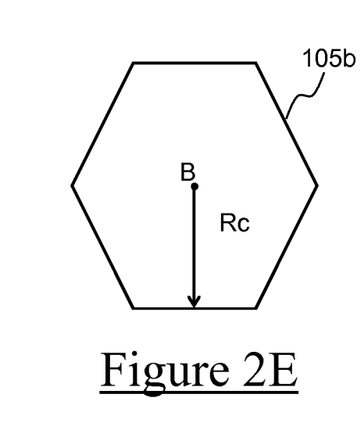

Turning now to FIGS. 2A 2E, they show exemplary shapes in which the cells 105b of the mobile communication network 105 may be modeled according to an embodiment of the present invention.

For the purposes of the present invention, each cell 105b of the mobile communication network 105 may be modeled as an area (hereinfater, area modeling), or as a Voronoi cell of a Voronoi tessellation diagram.

Considering for example the area modeling, the area of the cell 105b may have a disc-like shape (as shown in FIG. 2A) having a respective cell center B (not necessarily corresponding to a geographic position of the communication station 105a) and a respective cell radius Rc. Preferably, the cell radius Rc encloses an effectively served area (not shown) served by the corresponding communication station 105a (e.g., an area in which each point is reached by radio-signals transmitted by the communication station 105a). Alternatively, the cell radius Rc may correspond to the radius of a circumference that encloses a substantial part of the effectively served area, such as the 85% or more of the effectively served area, such as for example the 90%, of the effectively served area.

Alternatively, as visible in FIGS. 2B-2E, the area of the cell 105b may have the shape of a polygon, preferably a regular polygon. In this case, the cell center B may correspond to a center of mass (or centroid) of the polygon, whereas the cell radius Rc may correspond to a segment adjoining the center of mass of the polygon with a vertex of the polygon (as shown in FIGS. 2B and 2D) or with a midpoint of a side of the polygon (as shown in FIGS. 2C and 2E).

The effectively served area, and therefore the cell radius Rc, may be defined by means of well-known network planning software tools used by a provider of the cellular network 105, or may be computed on the basis of (omnidirectional or directional, such as with 120° radiation angles) antennas radiation diagrams and simple radiation models such as for example those disclosed in Theodore S. Rappaport, "*Wireless Communications*", Prentice Hall, 1996.

Preferably, the modeling, the list and the number of cells 105b of the mobile communication network 105 are inputted to the system 100 by the administrator through the administrator interface 120.

Figure 3:
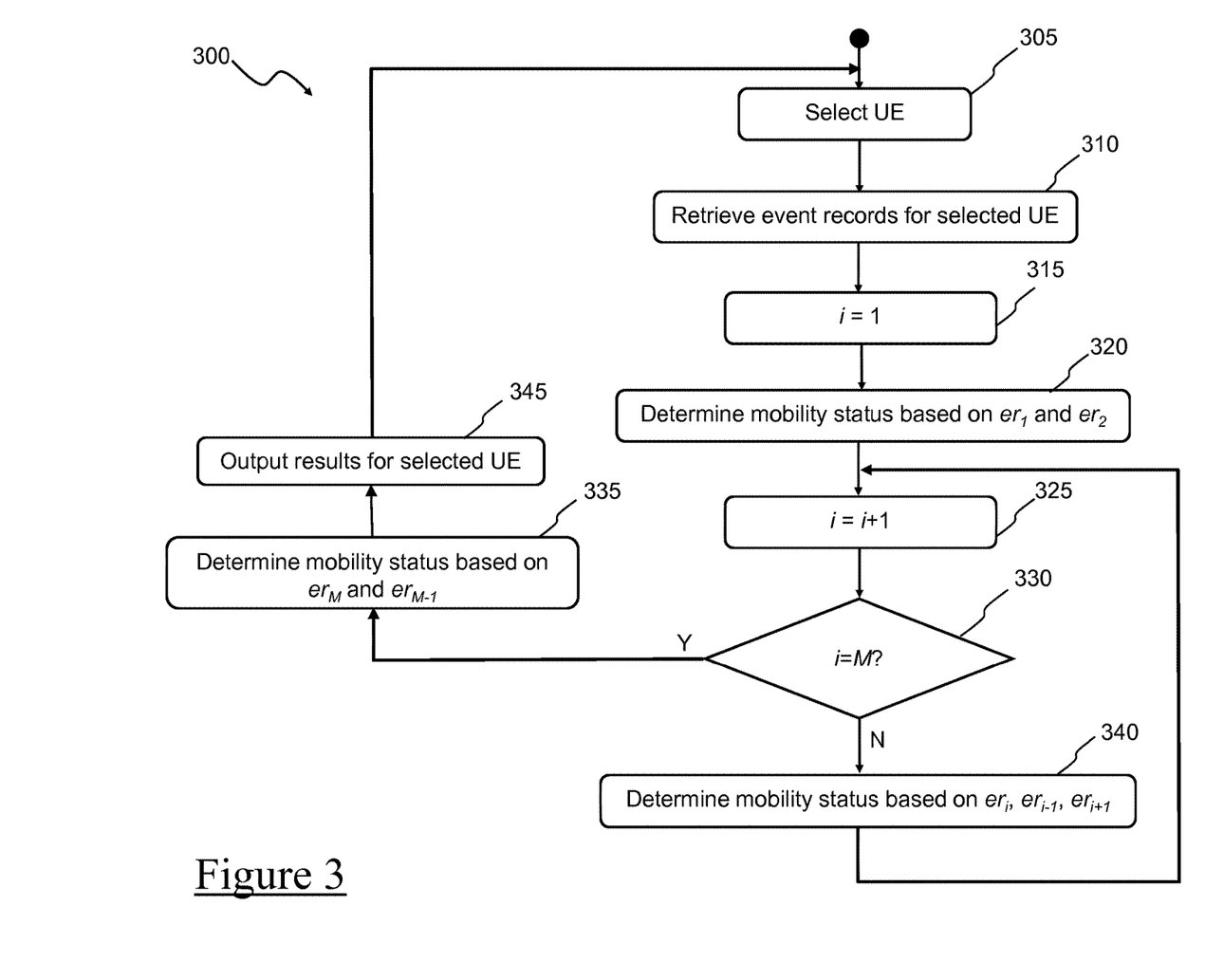
FIG. 3 shows a simplified activity diagram of a procedure, carried out by said system, for identifying the mobility status of a user, according to an embodiment of the present invention, and FIGS. 4A-4E schematically show cell conditions that may be detected during execution of said procedure, according to an embodiment of the present invention.

With reference now to FIG. 3, it shows a simplified activity diagram of a procedure 300, carried out by the system 100, for determining the mobility status of a user, according to an embodiment of the present invention. For ease of description, such a figure will be discussed jointly with FIGS. 4A-4E, which schermatically show cell conditions that may be detected during execution of the procedure 300.

Preferably, the procedure 300 is iterated for each UE (and, hence, for the respective user) whose mobility status has to be determined. This is conceptually represented, in the activity diagram, by loop connection between action node 305 (wherein a new iteration begins and selection of the next UE takes place) and action node 345 (wherein the mobility status of the UE selected in the previous iteration has been determined).

After UE selection, the event records related to that UE (and contained in the corresponding event record group $erg_n$) are retrieved from the repository 115 action node 310. Preferably, among the event records of the event record group $erg_n$, only a subset of event records are retrieved. Even more preferably, the subset of event records of the event record group $erg_n$ comprises event records related to that UE and occurred within a predetermined time period, for example a predetermined time period backwards from a time instant at which the procedure 300 for that UE has started. Therefore, the subset of event records is associated with a number M≤N of events occurred within the predetermined time period. From now on, each event record of the subset of event records of the event record group $erg_n$ (i.e., each event record of the subset of event records related to a certain UE) will be denoted by event record $er_i$ or i-th event record (i=1, . . . , M), wherein the event record $er_1$ (i=1) corresponds to the first event record related to that UE within the predetermined time period, and the event record $er_M$ corresponds to the last event record related to that UE within the predetermined time period.

In the following, for ease of description, the cell occupied by (i.e., pertaining to) the UE at the occurrence of the event of the i-th event record will be referred to as cell $105b_i$ or i-th cell, and the cell center and cell radius of the i-th cell will be denoted by cell center $B_i$ and cell radius $Rc_i$, respectively.

Similarly, the cell occupied by (i.e., pertaining to) the UE at the occurrence of the event of the event record following the i-th event record (i.e., the (i+1)-th event record) will be referred to as cell $105b_{i+1}$ or (i+1)-th cell, and the cell center and cell radius of the (i+1)-th cell will be denoted by cell center $B_{i+1}$ and cell radius $Rc_{i+1}$, respectively. Similarly, the cell occupied by (i.e., pertaining to) the UE at the occurrence of the event of the event record preceding the i-th event record (i.e., the (i−1)-th event record) will be referred to as cell $105b_{i-1}$ or (i−1)-th cell, and the cell center and cell radius of the (i−1)-th cell will be denoted by cell center $B_{i-1}$ and cell radius $Rc_{i-1}$, respectively.

Broadly speaking, for each i-th event record (and, hence, for each event or interaction) related to the selected UE, the i-th cell pertaining to that UE at the occurrence of that interaction is determined, thereafter the mobility status of that UE is determined according to at least one among:

- a comparison between the distance between the i-th cell and the (i−1)-th cell (preferably based on the distance between the cell center $B_i$ and the cell center $B_{i-1}$, hereinafter dist $(B\ B_{i-1})$) and a first threshold distance depending on the i-th and (i−1)-th cells (preferably, on the cell radius $Rc_i$ and the cell radius $Rc_{i-1}$, more preferably on a combination between the cell radius $Rc_i$ and the cell radius $Rc_{i-1}$, a linear combination between the cell radius $Rc_i$ and the cell radius $Rc_{i-1}$ in the preferred embodiment herein considered);
- a comparison between the distance between the i-th cell and the (i+1)-th cell (preferably based on the distance between the cell center $B_i$ and the cell center $B_{i+1}$, hereinafter dist$(B_i, B_{i+1})$) and a second threshold distance depending on the i-th and (i+1)-th cells (preferably, on the cell radius $Rc_i$ and the cell radius $Rc_{i+1}$, more preferably a combination between the cell radius $Rc_i$ and the cell radius $Rc_{i+1}$, a linear combination between the cell radius $Rc_i$ and the cell radius $Rc_{i+1}$ in the preferred embodiment herein considered).

Generally speaking, according to an embodiment of the present invention, for each i-th event record related to the considered UE, exception made for the first event record $er_1$ and the last event record $er_M$ (as discussed in the following), the following conditions may be checked.

$$\text{dist}(B_i, B_{i-1}) \leq k_{1A}Rc_i + k_{1B}Rc_{i-1} \qquad \text{Condition (i):}$$

If the distance dist$(B_i, B_{i-1})$ between the i-th cell and the (i−1)-th cell is lower than (or equal to) the threshold distance $k_{1A}Rc_i + k_{1B}Rc_{i-1}$, the UE is in the stay status at the occurrence of the event of the i-th event record.

Additionally or alternatively, the distance between the i-th cell and an average cell may be considered. Let $er_{i-1}$ be an event record associated with an event at the occurrence of which the UE is in the stay status, and let G (G>2) be the number of consecutive event records from the (i−1)-th event record (i.e., $er_{i-1}, er_{i-2}, er_{i-3}, \ldots er_{i-G}$) associated with (consecutive) events at the occurrence of which the UE is in the stay status, then an average cell may be identified as having center $B_G$ (e.g., determined as centroid of the cell centers $C_{i-1}, C_{i-2}, \ldots C_{i-G}$) and radius $R_G$ (e.g., determined as average radius of the cell radius $C_{i-1}, C_{i-2}, \ldots C_{i-G}$). In this scenario, according to condition (i) the stay status at the occurrence of the event of the i-th event record is determined for the UE if:

$$\text{dist}(B_i, B_G) \leq k_{1A}Rc_i + k_{1B}Rc_G$$

$$\begin{cases} \text{dist}(B_i, B_{i-1}) > k_{1A}Rc_i + k_{1B}Rc_{i-1} \\ \text{dist}(B_i, B_{i+1}) \leq k_{2A}Rc_i + k_{2B}Rc_{i+1} \end{cases} \qquad \text{Condition (ii)}$$

If the distance dist$(B_i, B_{i-1})$ between the i-th cell and the (i−1)-th cell is higher than the threshold distance $k_{1A}Rc_i + k_{1B}Rc_{i-1}$ and the distance dist$(B_i, B_{i+1})$ between the i-th cell and the (i+1)-th cell is lower than (or equal to) the threshold distance $k_{2A}Rc_i + k_{2B}Rc_{i+1}$, the UE is in the stay status at the occurrence of the event of the i-th event record;

$$\begin{cases} \text{dist}(B_i, B_{i-1}) > k_{1A}Rc_i + k_{1B}Rc_{i-1} \\ \text{dist}(B_i, B_{i+1}) > k_{2A}Rc_i + k_{2B}Rc_{i+1} \end{cases} \qquad \text{Condition (iii)}$$

If the distance dist$(B_i, B_{i-1})$ between the i-th cell and the (i−1)-th cell is higher than the threshold distance $k_{1A}Rc_i + k_{1B}Rc_{i-1}$ and the distance dist$(B_i, B_{i+1})$ between the i-th cell and the (i+1)-th cell is higher than the threshold distance $k_{2A}Rc_i + k_{2B}Rc_{i+1}$, the UE is in the motion status at the occurrence of the event of the i-th event record.

According to an embodiment of the present invention, the coefficients $k_{1A}$, $k_{1B}$, $k_{2A}$, $k_{2B}$ are configured by the administrator of the system 100 operating through the administrator interface 120. In order to simplify the configuration operation to the administrator of the system 100, advantageously the coefficients may be set at a same value, i.e.:

$$k_{1A} = k_{1B} = k_{2A} = k_{2B} = k$$

In this way, the cell radius are all weighted in the same way.

Preferably, the values of the coefficients $k_{1A}$, $k_{1B}$, $k_{2A}$, $k_{2B}$ (or of the coefficient k) are determined based on a sperimental analysis on a group of test users whose mobility status are known (at the occurrence of certain interactions), for example by determining the error of the procedure (e.g., the number of wrong mobility status) and by setting the values of the coefficients according to an error minimization criterion.

According to a preferred, not limiting embodiment of the present invention, $$k_{1A} = k_{1B} = k_{2A} = k_{2B} = k = 1$$

Figure 4A:
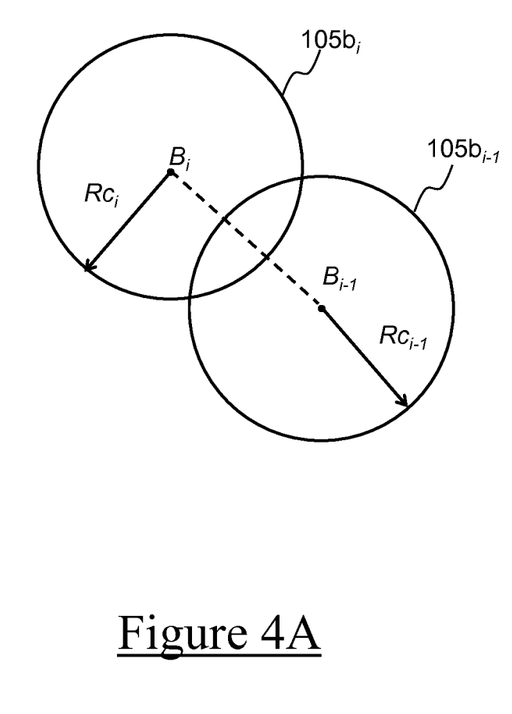
Figure 4B:
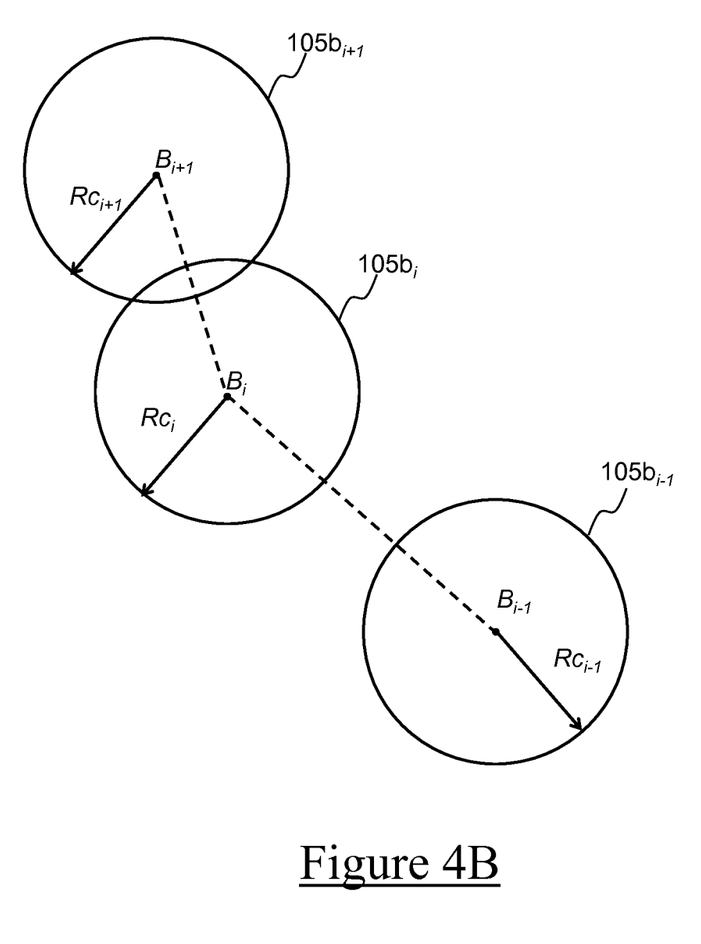
Figure 4C:
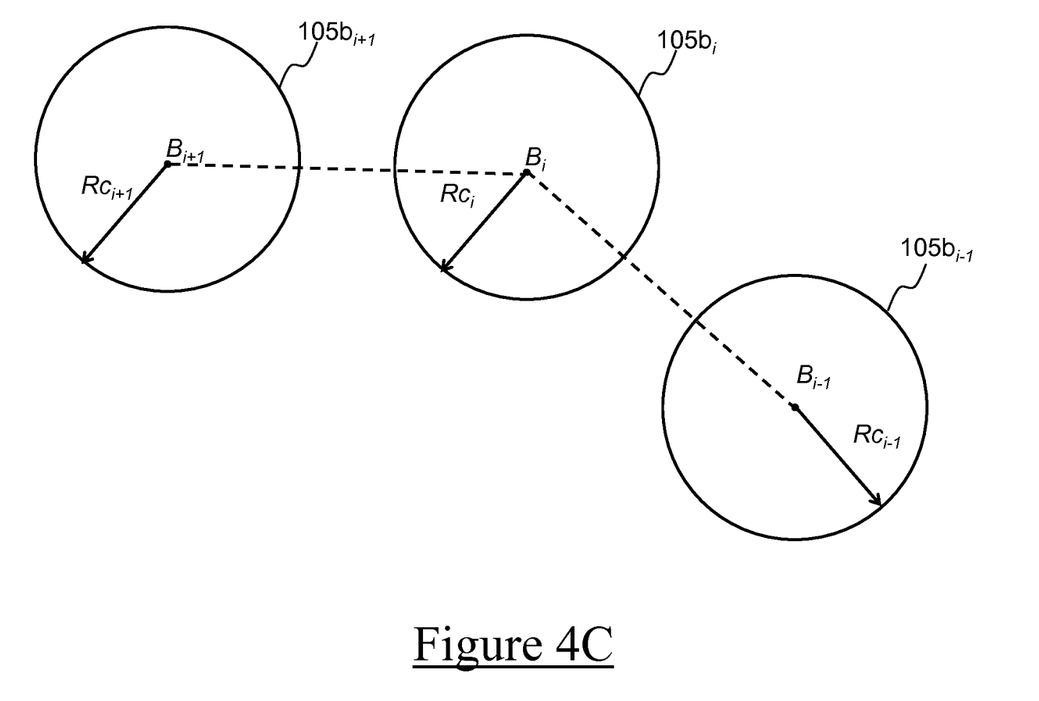

As should be readily understood, with this exemplary setting of the values of the coefficients $k_{1A}$, $k_{1B}$, $k_{2A}$, $k_{2B}$, condition (i) is satisfied if the i-th and (i−1)-th cells are partly superimposed (see FIG. 4A), condition (ii) is satisfied if the i-th and (i+1)-th cells are partly superimposed whereas the i-th and (i−1)-th cells are not (see FIG. 4B), and condition (iii) is satisfied if no superimposition takes place between the i-th and (i−1)-th cells and between the i-th and the (i+1)-th cells (see FIG. 4C).

Moreover, with this exemplary setting of the values of the coefficients $k_{1A}$, $k_{1B}$, $k_{2A}$, $k_{2B}$, in condition (i) the distance dist$(B_i, B_{i-1})$ between the i-th cell and the (i−1)-th cell may also be equal to the threshold distance $k_{1A}Rc_i + k_{1B}Rc_{i-1}$ (i.e. the i-th and (i−1)-th cells may also be tangent, as also mathematically expressed by the symbol ≤ in the inequality), and in condition (ii) the distance dist $(B_i, B_{i+1})$ between the i-th cell and the (i+1)-th cell may also be equal to the threshold distance $k_{2A}Rc_i + k_{2B}Rc_{i+1}$ (i.e. the i-th and (i+1)-th cells may also be tangent, as also mathematically expressed by the symbol ≤ in the inequality). In any case, cell tangencies may also be associated with other conditions, e.g. with a different mobility status; for example, the tangency between the i-th and (i−1)-th cells may instead be associated with the motion status (in which case the symbol ≤ in the inequality of condition (i) should be replaced by the symbol <, and the symbol > in the first inequality of condition (ii) should be replaced by the symbol ≥), and/or the tangency between the i-th and (i+1)-th cells may instead be associated with the motion status (in which case the symbol ≤ in the second inequality of condition (ii) should be replaced by the symbol <, and the symbol > in the second inequality of condition (iii) should be replaced by the symbol ≥).

Back to the activity diagram, after the event records related to the selected UE are retrieved from the repository 115 (action node 310), the first event record $er_1$ related to that UE within the predetermined time period is considered (as conceptually illustrated in the figure by initialization i=1 at action node 315) and the mobility status of that UE at occurrence of the event associated with the first event record $er_1$ is determined (action node 320).

As mentioned above, for the first event record $er_1$ the above conditions (i), (ii) and (iii) cannot be checked (at least completely), as no (i−1)-th cell is available.

According to an embodiment of the present invention, the mobility status of the UE at occurrence of the event associated with the first event record $er_1$ is determined based on a comparison between the distance between the first and second cells (denoted by 105$b_1$ and 105$b_2$ in FIG. 4D) occupied by the UE at the occurrence of, respectively, the events associated with the first $er_1$ and second $er_2$ event records (i.e., dist($B_1$, $B_2$)), and a combination between the respective cell radius $Rc_i$ and $Rc_2$ (a linear combination between the cell radius $Rc_i$ and the cell radius $Rc_2$ in the preferred embodiment herein considered).

Figure 4D:
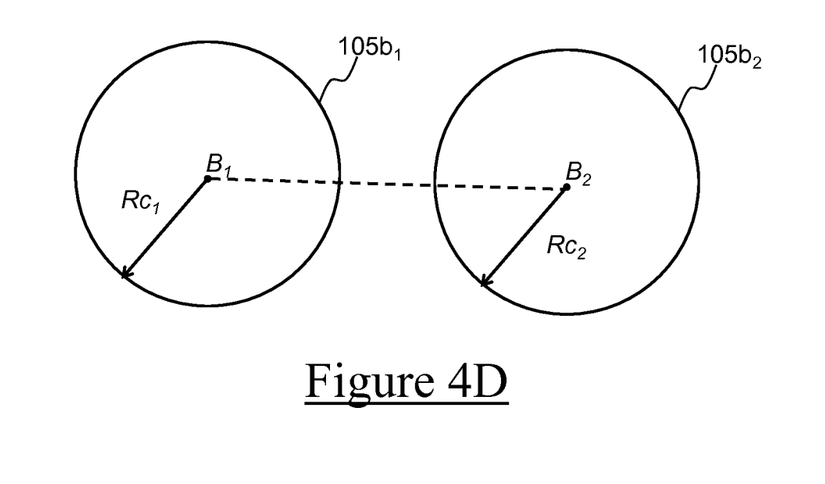

Preferably, if the distance dist($B_1$, $B_2$) between the first and second cells is equal to (or lower than) the threshold distance $Rc_i+Rc_2$ (similarly to the above, $k_{2A}=k_{2B}=1$), i.e. the first and second cells are partly superimposed or, at most, tangent, the UE is in the stay status at the occurrence of the event associated with the first event record $er_1$:

$$dist(B_1,B_2) \le Rc_1 + Rc_2$$

If this condition is not verified (scenario illustrated in FIG. 4D), the mobility status of the UE at the occurrence of the event associated with the first event record $er_1$ cannot be determined, in which case preferably the mobility status of the user is arbitrarily set at the stay or motion status. According to a preferred embodiment of the present invention, it is up to the administrator of the system 100, e.g. through the administrator interface 120, or the user, e.g. through the user interface 125, to arbitrarily set the mobility status when it cannot be determined. According to a different embodiment of the present invention, when the mobility status of the UE cannot be determined, the system 100 may autonomously (i.e., without administrator or user intervention) set the mobility status, by default, at the stay or motion status.

As mentioned above, for the last event record $er_M$ the above conditions (i), (ii) and (iii) cannot be checked (at least completely), as no (i+1)-th cell is available.

According to an embodiment of the present invention, the mobility status of the UE at the occurrence of the event associated with the last event record $er_M$ is determined based on a comparison between the distance between the cells (denoted by 105$b_{M-1}$ and 150$b_M$ in FIG. 4E) occupied by the UE at the occurrence of, respectively, the events associated with the second-last $er_{M-1}$ and last $er_M$ events (i.e., dist($B_{M-1}$,$B_M$)), and a combination between the respective cell radius $Rc_{M-1}$ and $Rc_M$ (a linear combination between the cell radius $Rc_{M-1}$ and the cell radius $Rc_M$ in the preferred embodiment herein considered).

Figure 4E:
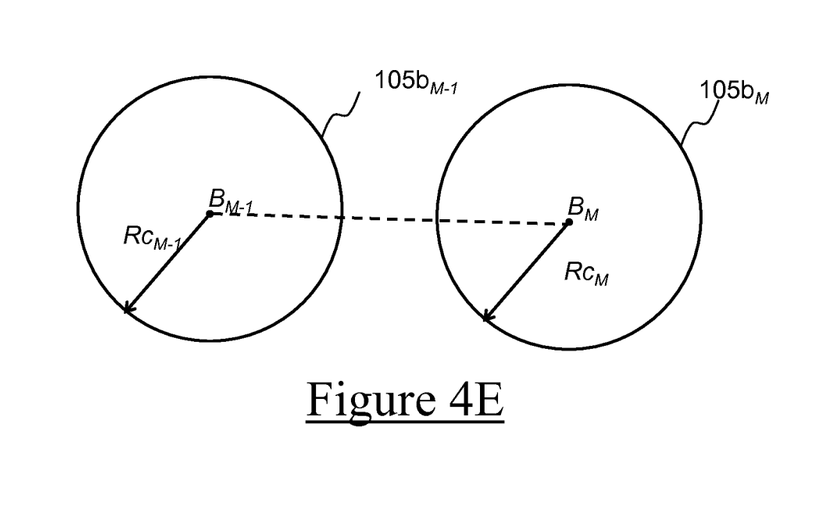

Preferably, if the distance dist($B_{M-1}$,$B_M$) between the second-last and last cells is lower than the threshold distance $Rc_{M-1}+Rc_M$ (similarly to the above, $k_{1A}=k_{1B}=1$), i.e. the second-last and last cells are at least partly superimposed, the UE is in the stay status at the occurrence of the event associated with the last event record $er_M$:

$$dist(B_{M-1},B_M) \le Rc_{M-1} + Rc_M$$

If this condition is not verified (see FIG. 4E), the mobility status of the UE at the occurrence of the event associated with the last event record $er_M$ cannot be determined, in which case preferably the mobility status of the user is arbitrarily set at the stay or motion status. According to a preferred embodiment of the present invention, it is up to the administrator of the system 100, e.g. through the administrator interface 120, or the user, e.g. through the user interface 125, to arbitrarily set the mobility status when it cannot be determined. According to a different embodiment of the present invention, when the mobility status of the UE cannot be determined, the system 100 may autonomously (i.e., without administrator or user intervention) set the mobility status, by default, at the stay or motion status.

Back to the activity diagram, after the mobility status of the UE at the occurrence of the event associated with the first event record en is determined (action node 320), the following event record $er_i$ is considered (action node 325) and a check is then performed (decision node 330) aimed at checking whether the currently considered event record $er_i$ is the last event record $er_M$ for the selected UE.

In the affirmative case, exit branch Y of decision node 330, i.e. the currently considered event record $er_i$ is the last event record $er_M$ for the selected UE, the mobility status of the UE at the occurrence of the event associated with the last event record $er_M$ is determined as discussed above (action node 335), i.e. based on a comparison between the distance between the second-last and last cells and a combination between the cell respective radius $Rc_{M-1}$ and $Rc_M$ (or, as discussed in connection with condition (i), based on the average cell taking into account the (M−G)-last events).

In the negative case, exit branch N of the decision node 330, i.e. the currently considered event record $er_i$ is not the last event record $er_M$ for the selected UE, the mobility status of the UE at the occurrence of the i-th event record $er_i$ is determined according to the above conditions (i), (ii) and (iii) (action node 340), thereafter the nodes 325, 330 and 340 are iterated until the last event record $er_M$ is considered (see loop connection between action node 340 and action node 325).

After the mobility status of the UE at the occurrence of the event associated with the last event record $er_M$ is determined (action node 340), the procedure 300 preferably outputs (action node 345) the mobility status of the selected UE at the occurrence of the events associated with all the i-th event records $er_i$ related to that UE within the predetermined time period, thereafter the following UE whose mobility status has to be determined is selected (see connection between action node 345 and action node 305) and the nodes 310-345 are repeated as such for the selected UE.

Thanks to the system 100 and the procedure 300, no fixed threshold is used to determine the mobility status of a user, thus no wrong mobility status are determined for users in those wireless communication networks (such as cellular networks) having very different coverage areas (and, hence, very different cell distances), such as urban and rural areas.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

More specifically, the present invention lends itself to be implemented through an equivalent method (by using similar steps, removing some steps being not essential, or adding further optional steps); moreover, the steps may be performed in different order, concurrently or in an interleaved way (at least partly).

In addition, analogous considerations apply if the system has a different structure or comprises equivalent components, or it has other operating features. In any case, any component thereof may be separated into several elements, or two or more components may be combined into a single element; in addition, each component may be replicated for supporting the execution of the corresponding operations in parallel. It should also be noted that any interaction between different components generally does not need to be continuous (unless otherwise indicated), and it may be both direct and indirect through one or more intermediaries.

The invention claimed is:

1. A method for determining the mobility status of a user of a wireless communication network, the mobility status indicating one of two statuses including a motion status when the user is in motion or a stay status when the user is not in motion, the method comprising:
   retrieving, from the wireless communication network, an indication of interactions between a user equipment associated with the user and the wireless communication network, and, for each interaction,
   determining a served area of the wireless communication network pertaining to the user equipment at the occurrence of that interaction, and
   determining the mobility status of the user at the occurrence of that interaction according to at least one among:
      a comparison between a distance between the served area and a first further served area of the wireless communication network pertaining to the user equipment at the occurrence of a first further interaction occurring before said interaction, and a first variable threshold distance determined based on the served area and on the first further served area;
      a comparison between a distance between the served area and a second further served area of the wireless communication network pertaining to the user equipment at the occurrence of a second further interaction occurring after said interaction, and a second variable threshold distance determined based on the served area and on the second further served area, wherein the first and second variable thresholds are set to higher for rural areas than for urban areas.

2. The method according to claim 1, wherein the first variable threshold distance depends on a radius ($Rc_i$) of the served area and on a radius ($Rc_{i-1}$) of the first further served area, and wherein the second variable threshold distance depends on the radius ($Rc_i$) of the served area and on a radius ($Rc_{i+1}$) of the second further served area.

3. The method according to claim 2, wherein said first variable threshold distance depends on a combination between the radius ($Rc_i$) of the served area and the radius ($Rc_{i-1}$) of the first further served area, and wherein said second variable threshold distance depends on a combination between the radius ($Rc_i$) of the served area and on the radius ($Rc_{i+1}$) of the second further served area.

4. The method according to claim 3, wherein said combination is a linear combination.

5. The method according to claim 1, wherein said determining the mobility status of the user at the occurrence of that interaction comprises:
   determining that the user is in the stay status if the distance between the served area and the first further served area is lower than the first variable threshold distance; or
   determining that the user is in the stay status if the distance between the served area and the first farther served area is higher than the first variable threshold distance and the distance between the served area and the second further served area is lower than the second variable threshold distance; or
   determining that the user is in the motion status if the distance between the served area and the first further served area is higher than the first variable threshold distance and the distance between the served area and the second further served area is higher than the second variable threshold distance.

6. The method according to claim 1, wherein said determining the mobility status of the user at the occurrence of the interaction comprises, if no first further interaction is provided with respect to said interaction,
   determining that the user is in the stay status if the distance between the served area and the second further served area is lower than the second variable threshold distance, and
   setting the mobility status of the user at the motion status otherwise.

7. The method according to claim 1, wherein said determining the mobility status of the user at the occurrence of the interaction comprises, if no second further interaction is provided with respect to said interaction:
   determining that the user is in the stay status if the distance between the served area and the first further served area is lower than the first variable threshold distance, and
   setting the mobility status of the user at the motion status otherwise.

8. The method according to claim 1, wherein the distance between the served area and the first further served area is based on the distance between a center ($B_i$) of the served area and a center ($B_{i-1}$) of the first further served area, and wherein the distance between the served area and the second further served area is based on the distance between the center ($B_i$) of the served area and a center ($B_{i+1}$) of the second further served area.

9. The method according to claim 8, wherein the first further served area comprises at least two served areas associated with consecutive interactions for which the stay status of the user has been determined, the center ($B_{i-1}$) of the first further served area being determined as centroid of the centers of said at least two served areas, and the radius ($Rc_{i-1}$) of the first further served area being determined as average radius of said at least two cells.

10. The method according to claim 1, wherein the mobile communication network is a GSM network, said indication about interactions comprising at least one between "Charging Data Records" data and "Visitor Location Records" data from the GSM network.

11. The method according to claim 1, wherein the mobile communication network is a LTE network, said indication about interactions comprising "Mobility Management Entity" data from the LTE network.

* * * * *